(12) United States Patent
Beverly

(10) Patent No.: US 6,438,986 B1
(45) Date of Patent: Aug. 27, 2002

(54) EVAPORATIVE COOLING APPARATUS

(76) Inventor: Rheinhardt John Beverly, 4150 W. Oldfather Pl., Tucson, AZ (US) 85641

(*) Notice: Subject to any disclaimer, the term of this patent is extended or adjusted under 35 U.S.C. 154(b) by 0 days.

(21) Appl. No.: 09/919,208

(22) Filed: Jul. 30, 2001

Related U.S. Application Data

(60) Provisional application No. 60/278,473, filed on Mar. 26, 2001.

(51) Int. Cl.[7] .................................................. F28D 5/00
(52) U.S. Cl. .............................. 62/310; 62/304; 62/314
(58) Field of Search .......................... 62/304, 310, 314

(56) References Cited

U.S. PATENT DOCUMENTS

| | | | | |
|---|---|---|---|---|
| 4,259,268 A | * | 3/1981 | DiRoss .......................... | 261/151 |
| 4,312,819 A | * | 1/1982 | Leyland ........................ | 261/152 |
| 4,612,778 A | * | 9/1986 | Medrano ....................... | 62/311 |
| 4,660,390 A | * | 4/1987 | Worthington ................. | 62/309 |
| 4,977,756 A | * | 12/1990 | Brock ........................... | 62/314 |
| 5,042,270 A | * | 8/1991 | Sanchez ........................ | 62/314 |
| 5,079,934 A | * | 1/1992 | Vinokurov ..................... | 62/304 |
| 5,529,536 A | * | 6/1996 | Sizemore et al. ............. | 454/157 |

* cited by examiner

Primary Examiner—William C. Doerrler
Assistant Examiner—Mark Shulman
(74) Attorney, Agent, or Firm—Mark Ogram

(57) ABSTRACT

An evaporative cooler in which a series of evaporative pads are positioned in a spaced apart relationship. Water from a reservoir is deposited onto the pads to moisten them. As the water on the pads evaporates, the surrounding air is cooled; thereby becoming denser and settling through the outlet at the bottom of the housing and into the area to be cooled. The falling cool air draws in warm air at the top of the housing, which in turn is then cooled by the pads to continue the cycle.

19 Claims, 4 Drawing Sheets

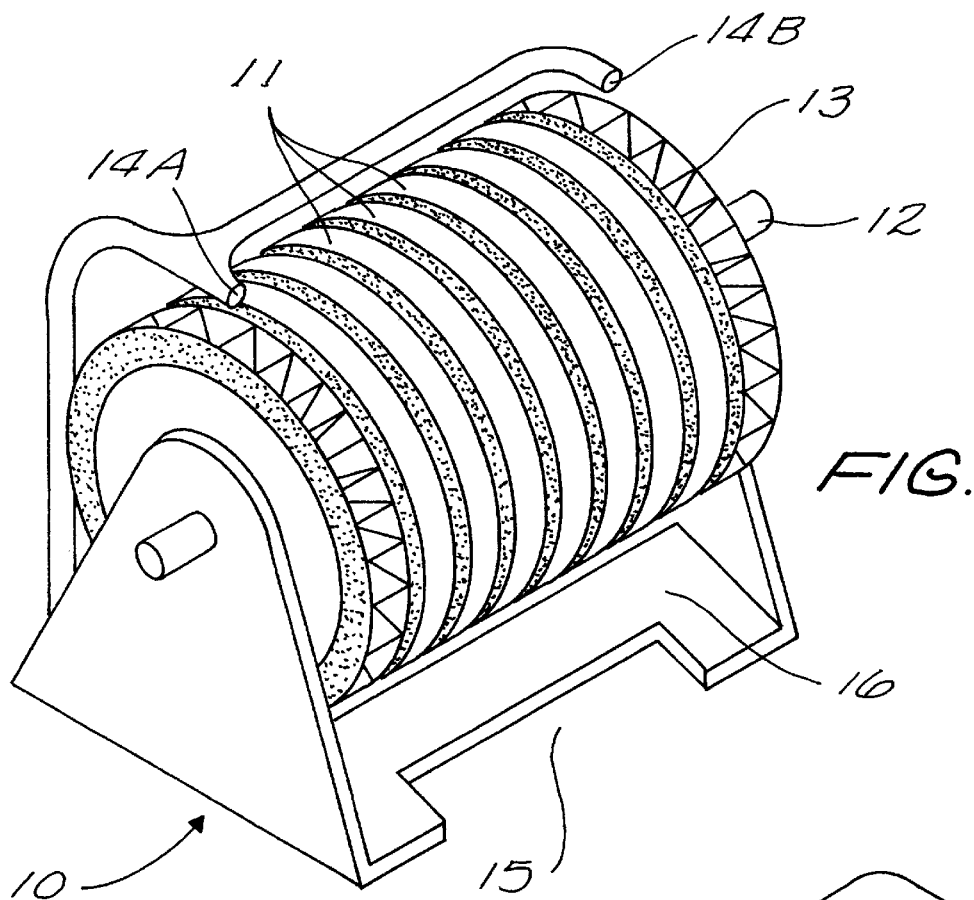
FIG. 1
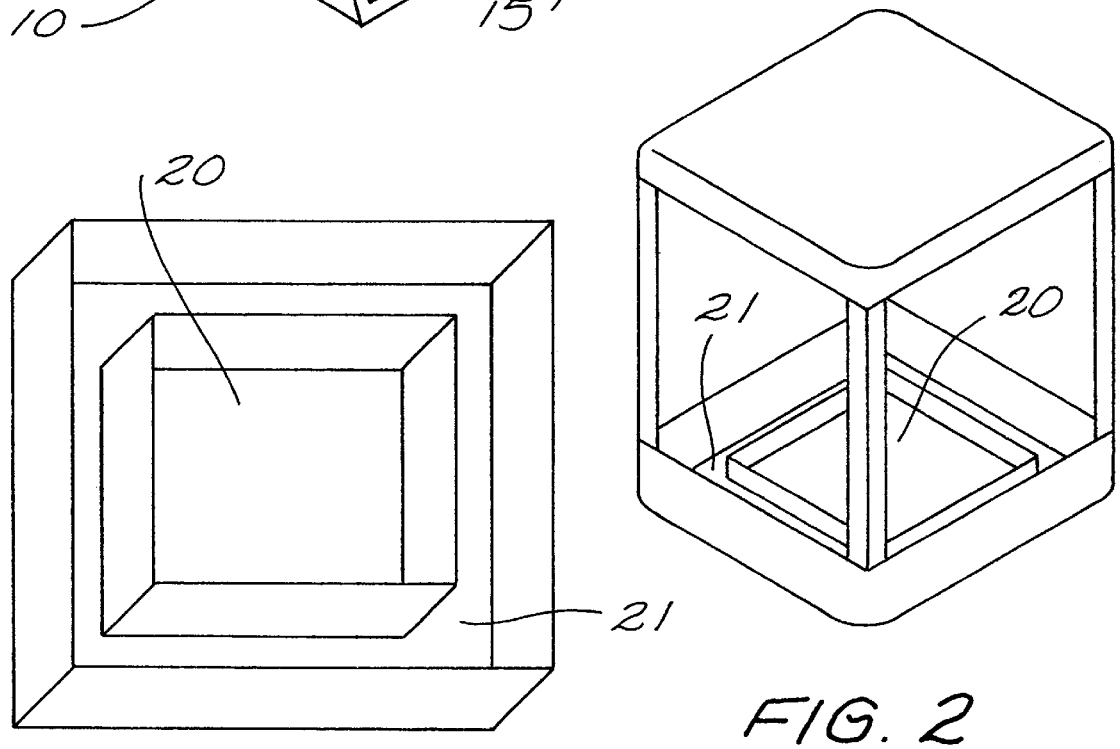
FIG. 3
FIG. 2

EVAPORATIVE COOLING APPARATUS

Priority for this application is claimed from United States Provisional patent application Ser. No. 60/278,473, filed on Mar. 26, 2001, and entitled: "Evaporative Cooler".

BACKGROUND OF THE INVENTION

This invention relates generally to cooling mechanisms for buildings and more particularly to evaporative cooling systems.

Man has been able to adapt to climates from extreme cold to extreme heat. To do so, dwellings have been constructed which are adapted for the environmental conditions found, then the interior of the dwelling is either heated or cooled to bring the internal temperature within a "comfort range". For desert climes, this means cooling the air within the rooms within the dwelling.

For dry/desert environments, the traditional choices for cooling the air is either through mechanical air conditioning or evaporative cooling. Mechanical air conditioning requires a great deal of electrical energy; hence, if possible, evaporative cooling is the technique of choice.

A typical evaporative cooler uses: a large electric motor with a fan; a small electric motor to pump the water; and, evaporative pads. The pump soaks the evaporative pads with water and the fan pulls air through the pads. As the air passes through the wetted pads, the air is cooled through the evaporative process. The now cooled air is pushed into the dwelling by the fan. To maintain a flow of air into the dwelling, windows or vents must be opened to allow the "proper" amount of air to flow through the house.

This design requires that the fan-motor pull and force the cold air. This is a difficult task as the pads, often layers of aspen fibers, restrict the easy flow of the air. Every time the air flow is deflected from its path by an obstruction, the air flow looses a significant of its velocity and its volumetric rate of flow.

It is clear there is a need for an improved evaporative cooling system.

SUMMARY OF THE INVENTION

The invention creates an evaporative cooler in which a series of evaporative pads are positioned in a spaced apart relationship within a housing unit.

In the preferred embodiment, these evaporative pads are relatively non-absorbent and are substantially circular in shape. Further, in the preferred embodiment, the pads are positioned vertically within the housing to allow the air to easily flow vertically between the pads.

Water from a reservoir is deposited onto the pads to moisten them. Once the pads have a thin layer of water on them, this layer of water serves to break the natural surface tension of the droplets being deposited on the pads. The breaking of the surface tension permits the droplets to spread out and coat the entire surface of the pads.

As the water on the pads evaporates, the surrounding air is cooled; thereby becoming denser and settling through the outlet at the bottom of the housing and into the area to be cooled. Note, no fan is used in this context; rather, air flow is created by the denser nature of cooled air.

As the cooled air falls from the housing, warm air is drawn into the top of the housing; the warm air is cooled by the water on the pads; and the cycle continues.

In one embodiment of the invention, the circular pads are held by a central spindle which rotates the pads (either electrically driven or through a water-wheel type of arrangement).

In reference to the preferred embodiment, the invention is ideal for homes with hip roofs for the desert area. The natural evaporation of water allows the air to flow unrestricted between the dampened round thin flat disks. In this embodiment, the pads are approximately ¼ of an inch apart and centered upon a spindle that runs through the center of the disks. The disks rotate on the spindle and are kept moistened by drops of water falling from the channeled water to the outer-most disks which are adapted to serve as water-wheels to drive the spindle.

To create rotation of the spindle in the preferred embodiment, the two disks on the outside of the row of disks are formed into two water wheels (i.e. having buckets) which catch the flowing water from the water pump and keep the spindle and the disks turning.

The surface tension of the water on the disks keep the disks wet; the evaporation of the water keeps the disks cools; air is allowed to flow freely through the narrow spaces between the disks. Once the disks have been wetted, a drop of water falling anywhere on the wetted disk is dispersed into the dampened portion of the disk since the drop's surface tension is broken by the water layer on the disk.

The arrangement of the preferred embodiment allows two opposing forces to work together, thereby greatly increasing the power of both opposing forces. The hot air rises without interference from the cold air as it falls. While the ambient hot air is rising, the cool air is channeled by a duct into the area to be cooled. This keeps the cold air from mixing with the hot air.

In one embodiment of the invention, the evaporative cooling system is placed over the attic of a building to cool the attic area. The hot air rises to the peak of the roof For hot air to escape easily, it must be replaced with other air. Therefore the cold air from the cooler is being sucked down the duct; encouraged by the force of the hot air trying to escape. This action increases the speed of the natural flow of the heavy cool air to fall.

In a short time, a blanket of cool air covers and penetrates all of the lower spaces between the joist in the attic. The cool air flows out through any low opening it can find. An opening made through the ceiling allows the excess cool air to flow into the room below, thereby circulating the air at the same time.

Using a second opening in the ceiling of one of the rooms below, the falling cool air forces the hotter air through the second opening. Preferably, this second opening extends above the layer of cool air within the attic. This lets the warm exiting air to reach the attic without disturbing the blanket of cool air covering the upper ceiling.

In another embodiment, the disks described above are replaced with strips of composition or metal. These strips are shaped with small "V" cuts which serve as spacers to keep narrow openings between adjoining strips. These strips are rolled into the desired diameter to make the evaporator.

To use this embodiment, the coiled material is set on a slight angles to the water allowing efficient air and water flow through the coiled material. A water wheel fastened to the upper end rotates this wheel and water dropping on the upper end of the turning wheel keeps the coiled evaporator damp.

While the preferred embodiment uses one small motor serving as the pump, other embodiments of the invention provide for a second motor to rotate the pad/disks within the housing.

A deflector serves to keep water from "dripping" into the exit duct. A space under the deflector allows air to flow unobstructed to an exit duct. This duct carries the cooled air into to the area of choice.

The invention, together with various embodiments thereof, will be more fully explained by the accompanying drawings and the following descriptions thereof.

DRAWINGS IN BRIEF

FIG. 1 is a perspective view of the evaporative pads of the preferred embodiment.

FIG. 2 is a perspective view of an embodiment of the housing.

FIG. 3 is a view of the housing showing the down draft opening.

Figure 5A:
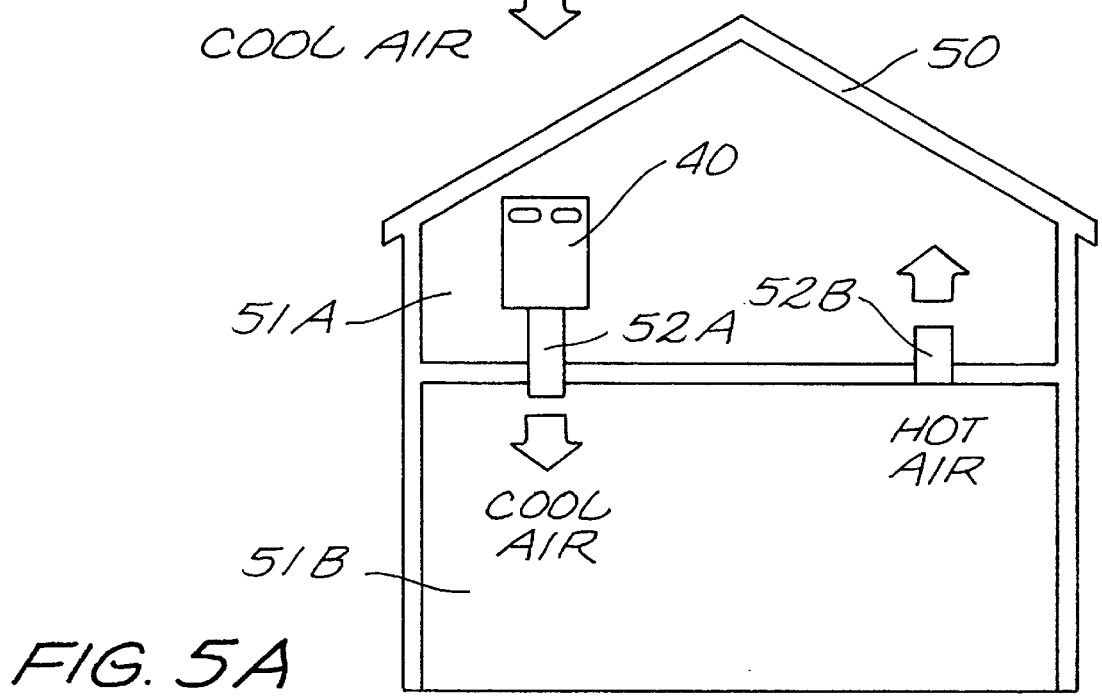
Figure 5B:
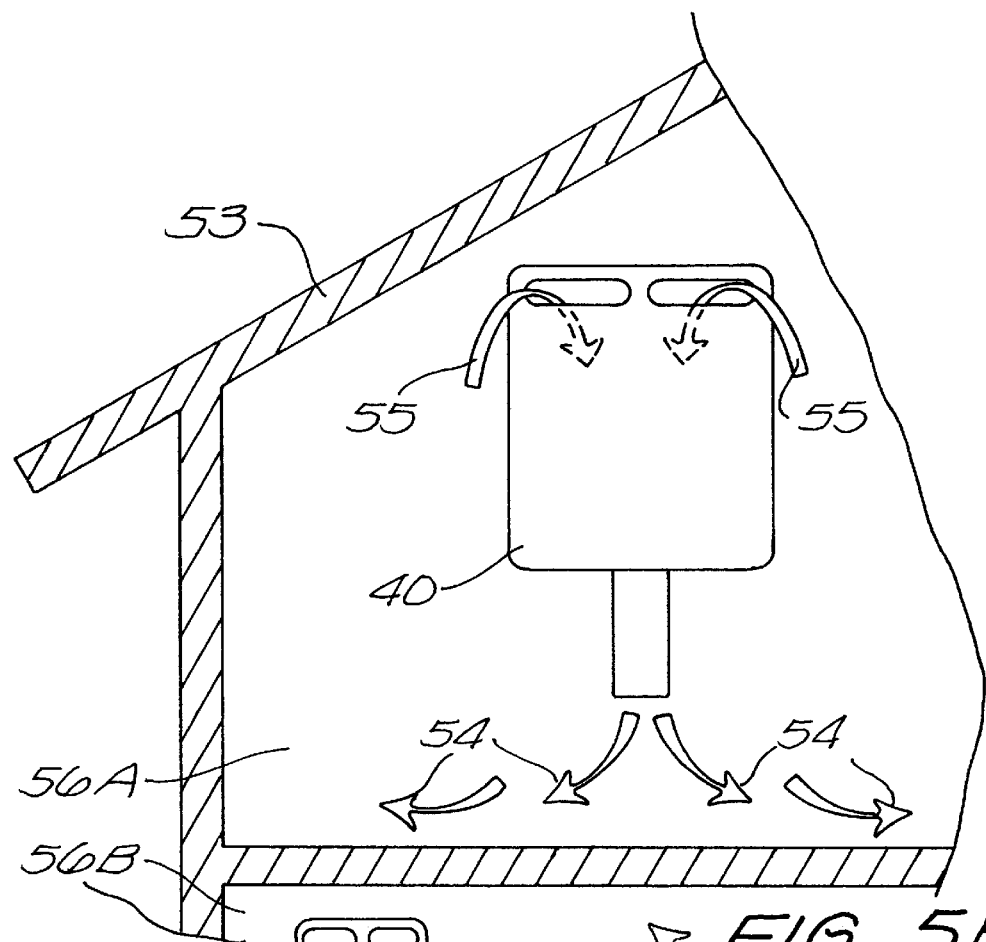
Figure 5C:
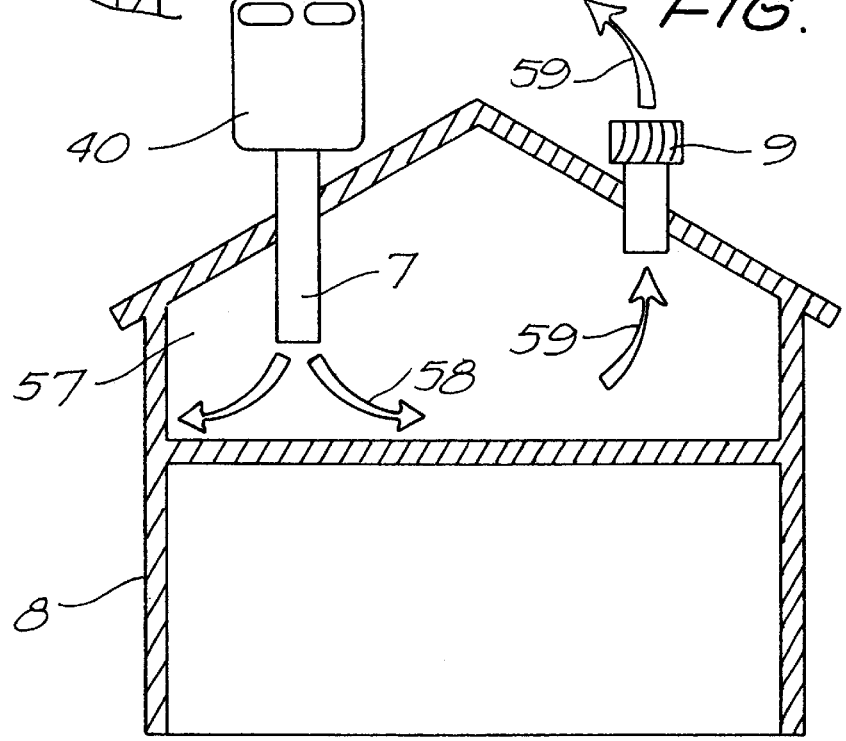

FIGS. 5A, 5B, and 5C pictorially illustrate three applications for the present invention.

Figure 6:
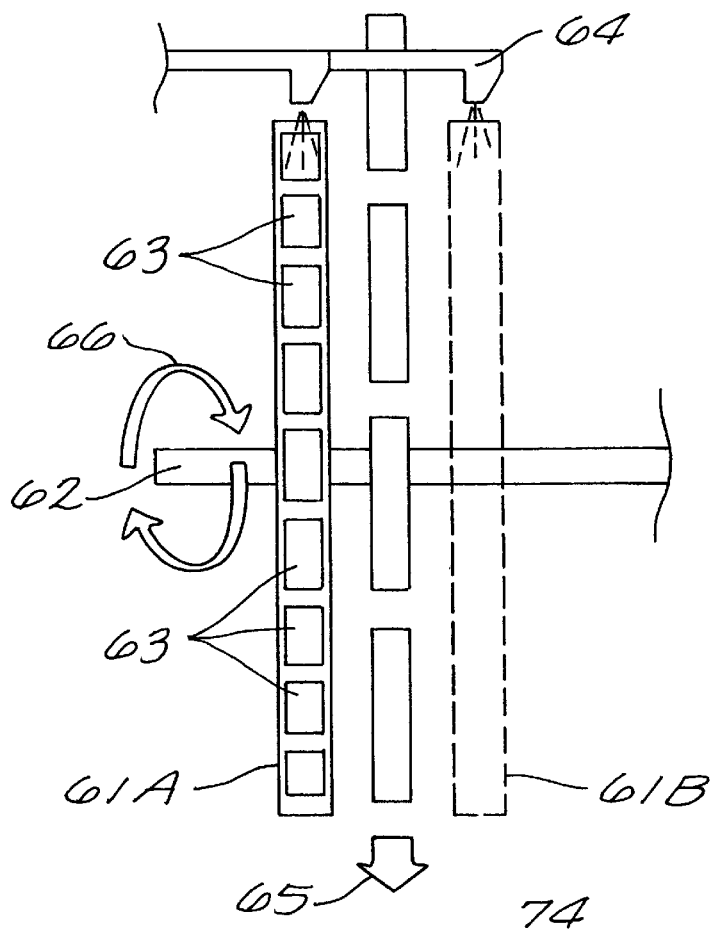

FIG. 6 illustrates the creation of a water wheel together with the wetting of the pads.

Figure 7:
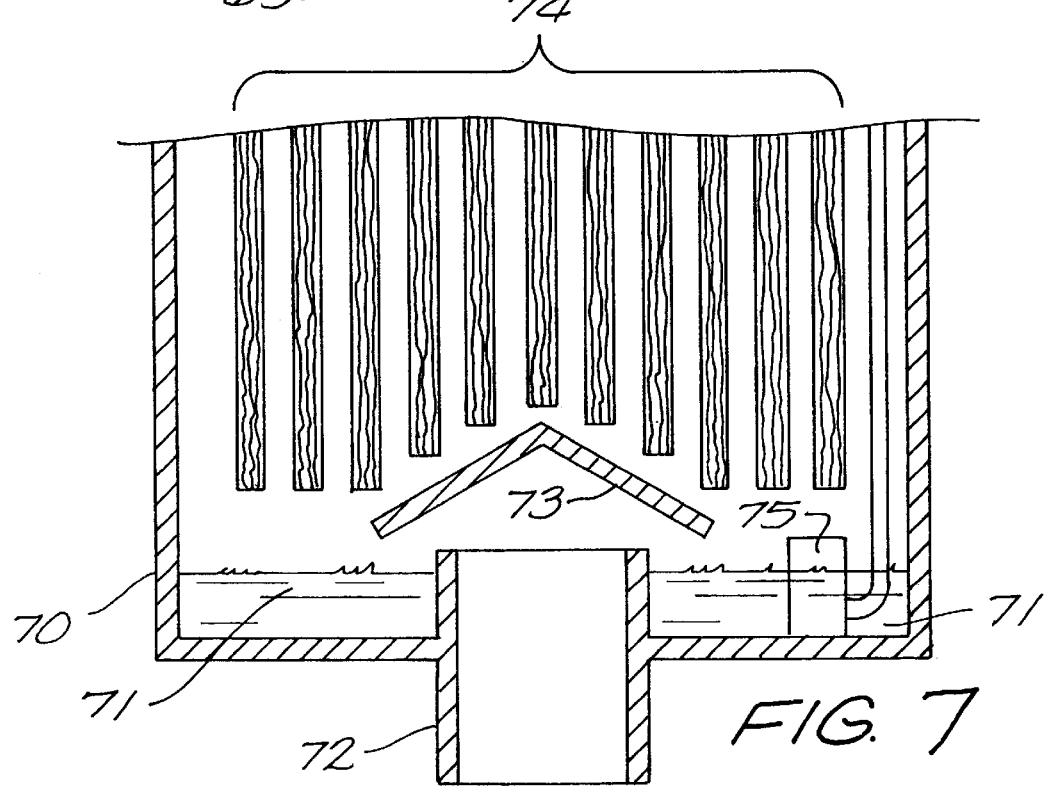

FIG. 7 is an interior view of a base portion of the preferred embodiment of the invention.

DRAWINGS IN DETAIL

FIG. 1 is a perspective view of the evaporative pads of the preferred embodiment.

Rotating cylinder 10 contains many thin flat circular disks 11 spaced about ¼ inch apart and fastened to spindle 12. The outer-most disks 13 of cylinder 10 have been fashioned into two water wheels. The water from the electric water pump (not shown) is diverted, 14A and 14B, into two streams of water which flow to the water wheels 13 and keep disks 11 turning.

Opening 15 allows the cool air to flow under the base and down the down draft opening (not shown) permitting the cooled air to flow into the attic. Cylinder 10 is held a short distance above the down draft chute so the cool air can easily flow under the base and through the down draft opening into the attic Base 16 of cylinder 10 deflects excess water from flowing into the down draft hole.

FIG. 2 is a perspective view of an embodiment of the housing.

In this illustration, the sides have been removed for ease of illustration. Opening 20 in the center of the bottom lets the cooled air to flow into the attic. Around center opening 20 is reservoir 21 which holds and collects water for use by the electric water pump (not shown). A water intake valve and float (both not shown) keeps reservoir 21 at a fixed depth.

FIG. 3 is a view of the housing showing the down draft opening. Down draft opening 20 is surrounded by reservoir 21 which collects the water. The water pump is typically located in reservoir 21.

Figure 4:
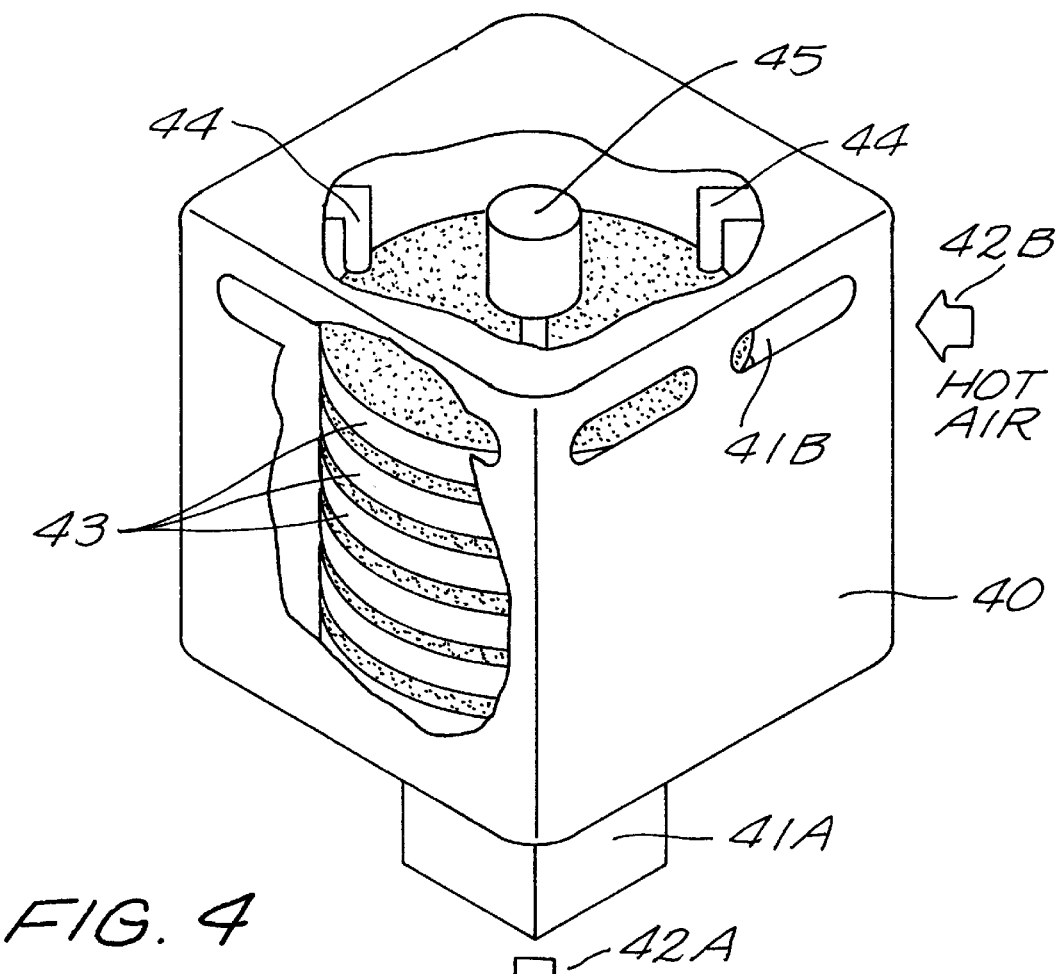
FIG. 4 is a perspective view of an alternative embodiment of the invention in which the pads are placed horizontally.

FIG. 4 is a perspective view of an alternative embodiment of the invention in which the pads are placed horizontally.

Housing 40 has outlet duct/opening 41A through which cool air 42A precipitates. At the top of housing 40 are a series of openings 41B which permit the ambient hot air 42B to enter.

Taking up the majority of the space within housing 40 are pads 43. In this embodiment pads 43 are arranged in a horizontal fashion. Water is applied to pad 43 using nozzles 44. Pads 43 are rotated using electric motor 45; this assures an even coating of water onto pads 43.

As the water on pads 43 evaporates, the surrounding air is cooled, causing it to become denser/heavier and to precipitate to the bottom of housing 40. The cool air precipitates through duct/opening 41A causing a draft to be created; thereby pulling in more ambient air through openings 41B.

FIGS. 5A, 5B, and 5C pictorially illustrate three applications for the present invention.

Dwelling 50 of figure 5A has an attic 51A and a living portion 51B. Evaporative cooler 40, as described above, is placed within attic 51A. Cooler 40 is placed in an elevated position within attic 51A with duct 52A communicating the cool air generated by evaporative cooler 40 into the living portion 51B.

Duct 52B allows the hot air to rise from the living portion 51B into attic 51A where it is cooled by evaporative cooler 40 to settle as cool air into living portion 51B. In this manner, the settling cool air assists in pushing the hot air from the living portion 51B to create a more comfortable environment.

The dwelling 53 of FIG. 5B utilizes evaporative cooler 40 to cool the attic portion 56A. This in turn assists in creating a comfortable living portion 56B by creating a blanket of cool air 54 between the living portion 56B and the hotter rising air 55.

As before, the hotter air 55 enters evaporative cooler 40 which cools the air allowing it to settle to create a blanket 54 of cool air.

FIG. 5C illustrates the preferred embodiment of the invention. In this embodiment, evaporative cooler 40 is positioned on the roof of dwelling 8. Exit duct 7 carries the cooled air 58 close to the floor of attic 57. Cooled air 58 flows outward along the floor of attic 57.

The rising hot air 59 (pushed by the cooled air and also by it natural "buoyancy", rises through vent 9 to escape into the atmosphere.

FIG. 6 illustrates the creation of a water wheel together with the wetting of the pads.

Pads 61A and 61B (only two are illustrated for ease of understanding) are secured to spindle/axle 62. Pad 61A is configured to include a series of buckets 63 therein. Buckets 63 serve as catch basins for water from dispenser 64. As a bucket is filled, the added weight produces a rotational force on pad 61A which in turn rotates spindle/axle 62 as indicated by arrow 66. Rotation of spindle/axle 62 causes all of the pads (such as pad 61B) to rotate and receive an even coating of water from dispenser 64.

This embodiment of the invention provides for an easy mechanism whereby the pump is used to create the rotation of the pads.

Another advantage of this embodiment is that the vertical arrangement of pads 61A and 61B create easy pathways for the flow of the precipitating air 65 as it cools. Without any flow restrictions, the cool air flow created by this embodiment is greatly improved.

FIG. 7 is an interior view of a base portion of the preferred embodiment of the invention.

Housing 70 creates reservoir 71 (filled with water) surrounding outlet 72. Pump 75 draws water from reservoir 71 and wets pads 74. The water which is not evaporated from pads 74, drips onto protective cover 73 which diverts the water back into reservoir 71, thereby protecting outlet 72 from becoming wet.

It is clear the present invention creates a highly improved cooling system.

What is claimed is:

1. An evaporative cooler comprising:
   a) a housing having,
      1) an exhaust opening located at the bottom of the housing,
      2) a water reservoir, and,
      3) air inflow openings configured to permit ambient air to enter said housing;
   b) at least two substantially circular evaporative pads positioned in spaced apart relationship to each other within said housing; and,
   c) a pump drawing water from said water reservoir and depositing said water onto said at least two substantially circular evaporative pads.

2. The evaporative cooler according to claim 1, wherein said at least two substantially circular evaportive pads are arranged substantially horizontal within said housing.

3. The evaporative cooler according to claim 1, wherein said at least two substantially circular evaporative pads are arranged substantially vertically within said housing.

4. The evaporative cooler according to claim 3, further comprising means for rotating said at least two substantially circular evaporative pads.

5. The evaporative cooler according to claim 4, wherein said means for rotating includes:
   a) a rotatable central axle supporting and secured to all of said at least two substantially circular evaporative pads; and,
   b) a series of buckets positioned along a periphery of at least one of said at least two substantially circular evaporative pads, each of said buckets positioned to receive water from said pump when an individual bucket is in an upper position and to dump water into said water reservoir when said bucket is in a lower position.

6. The evaporative cooling apparatus according to claim 3, further including a water baffle positioned above said exhaust opening of said housing so that falling water is directed to the water reservoir of said housing.

7. The evaporative cooling apparatus according to claim 6, wherein said water baffle is disposed between said at least two substantially circular evaporative pads and said exhaust opening.

8. The evaporative cooling apparatus according to claim 7, wherein cooled air within said housing precipitates and escapes through said exhaust opening.

9. The evaporative cooling apparatus according to claim 7, wherein air flow through said inflow openings is created solely by cool air escaping through said exhaust opening.

10. An evaporative cooler comprising:
    a) a housing having,
       1) an exhaust opening located at the bottom of the housing,
       2) a water reservoir, and,
       3) air inflow openings configured to permit ambient air to enter said housing;
    b) at least two evaporative pads positioned in spaced apart relationship to each other and contained within said housing;
    c) a reservoir containing water; and,
    d) a pump drawing water from said reservoir and depositing water onto said at least two substantially circular evaporative pads.

11. The evaporative cooler according to claim 10, wherein said at least two evaporative pads are each substantially circular in shape.

12. The evaporative cooler according to claim 11, wherein said at least two substantially circular evaporative pads are arranged substantially vertically within said housing.

13. The evaporative cooler according to claim 12, further comprising means for rotating said at least two substantially circular evaporative pads.

14. The evaporative cooler according to claim 13, wherein said means for rotating includes:
    a) a rotatable horizontal central axle supporting and secured to all of said at least two substantially circular evaporative pads; and,
    b) a series of buckets positioned along a peripheral portion of at least one of said at least two substantially circular evaporative pads, each of said buckets positioned to receive water from said pump when an individual bucket is in an upper position and to dump water into said water reservoir when said bucket is in a lower position.

15. The evaporative cooling apparatus according to claim 12, further including a water baffle positioned above said exhaust opening of said housing so that falling water is directed to the water reservoir of said housing.

16. The evaporative cooling apparatus according to claim 15, wherein said water baffle is disposed between said at least two substantially circular evaporative pads and said exhaust opening.

17. An evaporative cooler comprising:
    a) a housing having an exhaust opening located at the bottom thereof and at least one air inflow opening configured to permit ambient air to enter said housing;
    b) a reservoir containing water;
    c) at least two substantially circular evaporative pads positioned in spaced apart relationship to each other within said housing, said spaced apart at least two substantially circular evaporative pads occupying a majority of an interior space of said housing; and,
    d) a pump drawing water from said water reservoir and depositing said water onto said at least two substantially circular evaporative pads.

18. The evaporative cooler according to claim 17,
    a) wherein said at least two substantially circular evaporative pads are arranged substantially vertically within said housing; and,
    b) further including,
       a) a rotatable central axle supporting and secured to all of said at least two substantially circular evaporative pads, and,
       b) a series of buckets positioned along a periphery of at least one of said at least two substantially circular evaporative pads, each of said catch reservoirs positioned to receive water from said pump when an individual bucket is in an upper position and to dump water into said water reservoir when said bucket is in a lower position.

19. The evaporative cooling apparatus according to claim 17, further including a water baffle disposed between said at least two substantially circular evaporative pads and said exhaust opening such that falling water is directed to said reservoir.

* * * * *